(12) United States Patent
Wen et al.

(10) Patent No.: US 10,128,970 B2
(45) Date of Patent: Nov. 13, 2018

(54) BANDWIDTH ADJUSTABLE OPTICAL MODULE AND SYSTEM

(71) Applicant: Huawei Technologies Co., Ltd., Shenzhen (CN)

(72) Inventors: Yue Wen, Shenzhen (CN); Zhiguang Xu, Shenzhen (CN); Huafeng Lin, Shenzhen (CN); Xiaoping Zhou, Shenzhen (CN); Jing Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/187,437

(22) Filed: Jun. 20, 2016

(65) Prior Publication Data
US 2016/0301494 A1 Oct. 13, 2016

Related U.S. Application Data

(63) Continuation of application No. PCT/CN2013/090134, filed on Dec. 20, 2013.

(51) Int. Cl.
*G02B 6/30* (2006.01)
*H04J 14/02* (2006.01)
(Continued)

(52) U.S. Cl.
CPC ............ *H04J 14/02* (2013.01); *G02B 6/2938* (2013.01); *G02B 6/29338* (2013.01);
(Continued)

(58) Field of Classification Search
CPC ..................................... G02B 6/30; G02B 6/42
(Continued)

(56) References Cited

U.S. PATENT DOCUMENTS 4,451,916 A * 5/1984 Casper ............... H04B 10/2504
370/226
5,774,245 A * 6/1998 Baker ................ G02B 6/29361
385/17
(Continued)

FOREIGN PATENT DOCUMENTS

| CN | 1855778 A | 11/2006 |
| CN | 201336661 Y | 10/2009 |

(Continued)

OTHER PUBLICATIONS

Kanazawa et al., "Extremely Small-form 100GbE Transmitter Optical Sub-assembly for Future Inter Data Center Cloud Networks," OFC/NFOEC Postdeadline Papers, The Optical Society, Washington, DC (2012).

(Continued)

*Primary Examiner* — Kaveh C Kianni
(74) *Attorney, Agent, or Firm* — Leydig, Voit & Mayer, Ltd.

(57) ABSTRACT

A circuit board of the optical module comprises: a first electrical interface is configured to connect an electrical interface of a board or a second electrical interface of another optical module, and a second electrical interface is configured to connect a first electrical interface of another optical module; a first optical port is configured to connect an optical transmission device or a second optical port of another optical module, and a second optical port is configured to connect an optical receiving device or a first optical port of another optical module; and a optical transceiver assembly multiplexes downstream light and demultiplexes upstream light. The optical module provided in solutions of the present invention can be flexibly combined with another optical module, enabling flexible and gradual upgrade of an (Continued)

optical module bandwidth according to a user requirement by using various combination manners.

6 Claims, 11 Drawing Sheets

(51) Int. Cl.
| | |
|---|---|
| *G02B 6/42* | (2006.01) |
| *G02B 6/293* | (2006.01) |
| *H04B 10/27* | (2013.01) |
| *H04B 10/40* | (2013.01) |
| *H04B 10/50* | (2013.01) |

(52) U.S. Cl.
CPC ........... *G02B 6/29361* (2013.01); *G02B 6/30* (2013.01); *G02B 6/428* (2013.01); *G02B 6/4215* (2013.01); *G02B 6/4246* (2013.01); *G02B 6/4263* (2013.01); *G02B 6/4278* (2013.01); *G02B 6/4284* (2013.01); *G02B 6/4292* (2013.01); *G02B 6/4295* (2013.01); *H04B 10/27* (2013.01); *H04B 10/40* (2013.01); *H04B 10/503* (2013.01); *H04J 14/0236* (2013.01); *H04J 14/0245* (2013.01); *H04J 14/0249* (2013.01); *H04J 14/0282* (2013.01)

(58) Field of Classification Search
USPC .......................................................... 385/14
See application file for complete search history.

(56) References Cited

U.S. PATENT DOCUMENTS

| | | | | |
|---|---|---|---|---|
| 6,490,727 B1* | 12/2002 | Nazarathy | ........... | H04J 14/0226 348/E7.071 |
| 6,606,427 B1* | 8/2003 | Graves | ................. | G02B 6/3849 385/17 |
| 6,650,808 B1* | 11/2003 | Vujcic | ................. | H04B 10/1143 385/134 |
| 6,690,848 B2* | 2/2004 | Graves | .................... | H04J 14/02 385/16 |
| 8,678,673 B2* | 3/2014 | Lin | ..................... | G06K 19/0728 385/14 |
| 9,225,454 B1* | 12/2015 | Liu | .......................... | H04J 14/02 385/58 |
| 2002/0021855 A1* | 2/2002 | Kim | ......................... | G02B 6/43 385/15 |
| 2002/0102046 A1* | 8/2002 | Newberg | ................. | G02B 6/43 385/17 |
| 2002/0136231 A1* | 9/2002 | Leatherbury | ........ | H04L 12/2801 370/442 |
| 2002/0149815 A1* | 10/2002 | Schafer | .............. | H04Q 11/0005 398/56 |
| 2002/0191250 A1* | 12/2002 | Graves | ............... | H04Q 11/0066 398/82 |
| 2003/0210870 A1* | 11/2003 | Graves | ............... | H04Q 11/0005 385/71 |
| 2004/0028323 A1* | 2/2004 | Bennett | ............... | H04J 14/0201 385/24 |
| 2004/0213286 A1* | 10/2004 | Jette | ......................... | H04J 14/02 370/466 |
| 2005/0089027 A1* | 4/2005 | Colton | ............... | H04Q 11/0005 370/380 |
| 2005/0168962 A1* | 8/2005 | Takeuchi | .............. | G02B 6/4246 361/796 |
| 2005/0169321 A1* | 8/2005 | Farley | ................. | H04J 14/0282 370/535 |
| 2006/0020975 A1* | 1/2006 | Kenny | ............. | H04B 10/25751 725/63 |
| 2006/0126993 A1* | 6/2006 | Piede | ........................ | G02B 6/43 385/14 |
| 2007/0274715 A1* | 11/2007 | Pichler | ................ | H04J 14/0212 398/48 |
| 2008/0050117 A1* | 2/2008 | Koley | ................. | H04J 14/0227 398/49 |
| 2009/0154930 A1* | 6/2009 | Hinderthuer | ....... | H04Q 11/0005 398/83 |
| 2009/0226172 A1* | 9/2009 | Larikova | ............. | H04J 14/0205 398/83 |
| 2010/0054751 A1 | 3/2010 | Murry et al. | | |
| 2010/0239266 A1* | 9/2010 | Kash | ................... | H04Q 11/0005 398/135 |
| 2011/0008042 A1* | 1/2011 | Stewart | ............ | H04B 10/25753 398/42 |
| 2011/0026922 A1* | 2/2011 | Ota | ..................... | H04J 14/0282 398/70 |
| 2012/0166582 A1* | 6/2012 | Binder | .................... | H04L 63/18 709/217 |
| 2013/0084070 A1 | 4/2013 | Ho et al. | | |
| 2013/0183039 A1 | 7/2013 | Hood et al. | | |
| 2015/0106668 A1* | 4/2015 | Ran | ..................... | H04L 43/0847 714/704 |
| 2015/0139647 A1* | 5/2015 | Soto | .................... | H04B 10/2503 398/58 |

FOREIGN PATENT DOCUMENTS

| | | |
|---|---|---|
| CN | 101656743 A | 2/2010 |
| CN | 102821331 A | 12/2012 |
| CN | 103401612 A | 11/2013 |
| JP | H0685825 A | 3/1994 |
| JP | 2005257940 A | 9/2005 |
| WO | WO 2013096688 A1 | 6/2013 |

OTHER PUBLICATIONS

Yoshimatsu et al., "Compact and high-sensitivity 100-Gb/s (4×25Gb/s) APD-ROSA with a LAN-WDM PLC demultiplexer," Optics Express, vol. 20, No. 26, pp. B393-B398, OSA Publishing, The Optical Society, Washington, DC (Dec. 10, 2012).

* cited by examiner

BANDWIDTH ADJUSTABLE OPTICAL MODULE AND SYSTEM

CROSS-REFERENCE TO RELATED APPLICATIONS

This application is a continuation of International Application No. PCT/CN2013/090134, filed on Dec. 20, 2013 which is hereby incorporated by reference in its entirety.

TECHNICAL FIELD

The present invention relates to the field of mobile communications technologies, and in particular, to a bandwidth adjustable optical module and a system.

BACKGROUND

The 40G TWDM-PON (Time Wavelength Division Multiplexed and Passive Optical Network) has now been primarily determined by a standardization organization as a standard architecture of the NG-PON2 (Next Generation Passive Optical Network 2, next generation passive optical network 2). One of key technologies of the 40G TWDM PON is to implement a 4×10 Gbps OLT (Optical Line Terminal, optical line terminal) transmitter optical module. Currently, a relatively common solution is to dispose 4 TOSAs (Transmitter Optical Subassembly, transmitter optical subassembly) and 4 ROSAs (Receiver Optical Subassembly, receiver optical subassembly) together in one module to form a 40G TWDM PON module, as shown in FIG. 1. It can be learned according to a structure described in FIG. 1 that both the transmitter optical subassemblies and the receiver optical subassemblies are packaged with four in one at a time to form a transmitter component with a rate of 40 Gbps. For both a user and a supplier, this solution has gone beyond demands, which consequently causes a large quantity of wasted resources.

SUMMARY

Embodiments of the present invention provide a bandwidth adjustable optical module, which is used to resolve a problem in the prior art that packaging multiple transceiver subassemblies in an optical module at a time causes a large quantity of wasted resources.

A first aspect provides an optical module, applied to a passive optical network, where a circuit board of the optical module is provided with a first electrical interface and a second electrical interface, a first optical port and a second optical port, and an optical transceiver assembly;

the first electrical interface is configured to connect an electrical interface of a board or a second electrical interface of another optical module, and the second electrical interface is configured to connect a first electrical interface of another optical module or an electrical interface of the board;

the first optical port is configured to connect an optical transmission device or a second optical port of another optical module, and the second optical port is configured to connect an optical receiving device or a first optical port of another optical module; and after being input into the optical transceiver assembly through the first optical port, downstream incident light is multiplexed, by using the optical transceiver assembly, with light that is generated by the optical transceiver assembly, and downstream light formed by multiplexing is output through the second optical port; and after upstream incident light is input into the optical transceiver assembly through the second optical port, light corresponding to a wavelength of the optical module is filtered out by using the optical transceiver assembly, and upstream light remaining after filtering is output through the first optical port.

With reference to the first aspect, in a first possible implementation manner, the first optical port contains a first upstream optical port and a first downstream optical port, and the second optical port contains a second upstream optical port and a second downstream optical port;

after being input into the optical transceiver assembly through the first downstream optical port, the downstream incident light is multiplexed with the light that is generated by the optical transceiver assembly, and the downstream light formed by multiplexing is output through the second downstream optical port; and after the upstream incident light is input into the optical transceiver assembly through the second upstream optical port, the light corresponding to the wavelength of the optical module is filtered out by using the optical transceiver assembly, and the upstream light remaining after filtering is output through the first upstream optical port.

With reference to the first possible implementation manner of the first aspect, in a second possible implementation manner, the transceiver optical assembly includes a receiver optical subassembly and a transmitter optical subassembly, the transmitter optical subassembly includes a semiconductor laser diode LD, a collimation lens, a filter TFF, a self-focusing lens Grin lens, an optical fiber tube, and two optical fibers that are provided in the optical fiber tube, where the two optical fibers are connected to the first downstream optical port and the second downstream optical port respectively;

after being led to the Grin lens through a first optical fiber in the optical fiber tube, downstream incident light of a first wavelength enters the TFF;

the LD emits light of a second wavelength, and the light of the second wavelength enters the TFF in a collimated manner through the collimation lens; and the TFF multiplexes the light of the second wavelength and the light of the first wavelength to form downstream light, and the downstream light is output through a second optical fiber of the two optical fibers by using the Grin lens and the optical fiber tube.

With reference to the second possible implementation manner of the first aspect, in a third possible implementation manner, the transmitter optical subassembly further includes any type of case of a miniature device case, a transistor outline case, and an integral case, where the LD, the collimation lens, the TFF, the Grin lens, and the optical fiber tube are packaged in the any type of case.

With reference to the first possible implementation manner of the first aspect, in a fourth possible implementation manner, the optical module further includes a wavelength division multiplexer WDM, and the optical transceiver assembly includes a semiconductor laser diode LD, a receiver APD, a silicon microring resonator, and a collimation lens, where after entering a first microring through an upper semi-ring of the first microring in the silicon microring resonator, light of a second wavelength emitted by the LD is transmitted to a first straight line that is connected to a lower semi-ring of the first microring, and is multiplexed with downstream incident light of a first wavelength, and after being reflected to the second downstream optical port by using the collimation lens, light obtained by multiplexing enters the WDM and is output, where the downstream incident light of the first wavelength is input to the first straight line of the optical module through the first downstream optical port; and upstream incident light is reflected by the WDM to the second upstream optical port and enters the optical module, the collimation lens in the optical module reflects the upstream incident light to a second straight line in the silicon microring resonator, and a second microring and a third microring in the silicon microring resonator that are connected to the second straight line correspondingly pass light, of a third wavelength corresponding to the wavelength of the optical module, formed by a transverse electric mode TE wave and a transverse magnetic mode TM wave, and send the light of the third wavelength to the APD for receiving, where light of another wavelength except the light of the third wavelength in the upstream light is reflected by the second straight line in the microring to the first upstream optical port for output.

With reference to the first aspect, in a fifth possible implementation manner, the optical transceiver assembly includes a first wavelength division multiplexer WDM 1, a second wavelength division multiplexer WDM 2, a semiconductor laser diode LD, a first filter TFF 1, a second filter TFF 2, a receiver APD, and a mirror, where when entering the optical module through the first optical port and being reflected by the mirror to the TFF 1, downstream incident light of a first wavelength is reflected, and is multiplexed with light of a second wavelength generated by the LD, and after entering the WDM 1, downstream light formed by multiplexing is projected to the second optical port for output; and after upstream incident light enters the optical module through the second optical port, the upstream incident light is reflected to the TFF 2 by using the WDM 1, and the TFF 2 passes light of a third wavelength corresponding to the wavelength of the optical module and sends the light of the third wavelength to the APD for receiving, where after being reflected by the TFF 2, light of another wavelength except the light of the third wavelength in the upstream incident light is reflected by the WDM 2 and the mirror to the first optical port for output.

A second aspect provides a bandwidth adjustable optical module. The bandwidth adjustable optical module includes at least two optical modules according to the first aspect or any one of the first to the fifth possible implementation manners of the first aspect, the at least two optical modules are cascaded by using the first electrical interface, the second electrical interface, the first optical port, and the second optical port, and an adjustable bandwidth of the bandwidth adjustable optical module formed by cascading is a sum of bandwidths of the cascaded optical modules, where a first electrical interface of a first optical module of the two cascaded optical modules is connected to a second electrical interface of a second optical module, and a first optical port of the first optical module is connected to a second optical port of the second optical module; and an optical port of the cascaded optical modules that is not connected to another optical module is correspondingly connected to an optical transceiver device, and an electrical interface of the cascaded optical modules that is not connected to another optical module is correspondingly connected to a board.

A third aspect provides a bandwidth adjustable optical module. The optical module includes at least two optical modules according to the first aspect or any one of the first to the fifth possible implementation manners of the first aspect, an optical multiplexer/demultiplexer, and a board, where first electrical interfaces and second electrical interfaces of the at least two optical modules are connected to the board, first optical ports and second optical ports of the at least two optical modules are connected to the optical multiplexer/demultiplexer, and an adjustable bandwidth of the bandwidth adjustable optical module is a sum of bandwidths of the at least two optical modules; and the multiplexer/demultiplexer is disposed on the board, demultiplexes an optical signal input into the at least two optical modules, sends optical signals obtained by demultiplexing to corresponding optical modules, receives optical signals output by the at least two optical modules, multiplexes the received optical signals, and outputs an optical signal obtained by multiplexing through an optical fiber.

A fourth aspect provides an optical line terminal, where the optical line terminal includes the optical module according to the first aspect or any one of the first to the fifth possible implementation manners of the first aspect, the second aspect, and the third aspect.

A fifth aspect provides a passive optical network system, where the system includes an optical line terminal and an optical network terminal, where the optical line terminal includes the optical module according to the first aspect or any one of the first to the fifth possible implementation manners of the first aspect, the second aspect, and the third aspect.

The optical module provided in solutions of the present invention can be flexibly combined with another optical module, enabling flexible and gradual upgrade of an optical module bandwidth according to a user requirement by using various combination manners.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In an optical module according to the embodiments of the present invention, when upgrade is needed because a bandwidth is not sufficient for use in a case in which one optical module with a rate of 10 Gbps is provided in a board, another optical module with a rate of 10 Gbps can be provided in a manner of optical module addition. In this way, upgrade can be implemented gradually at low costs without the need of upgrade to 40G at a time, which avoids excessive costs caused by surplus demands and achieves pay per demand and low power consumption.

For the foregoing description of the total solution of the embodiments of the present invention, in specific application, addition of an optical module may be implemented in two manners, which specifically include:

Embodiment 1

Figure 1:
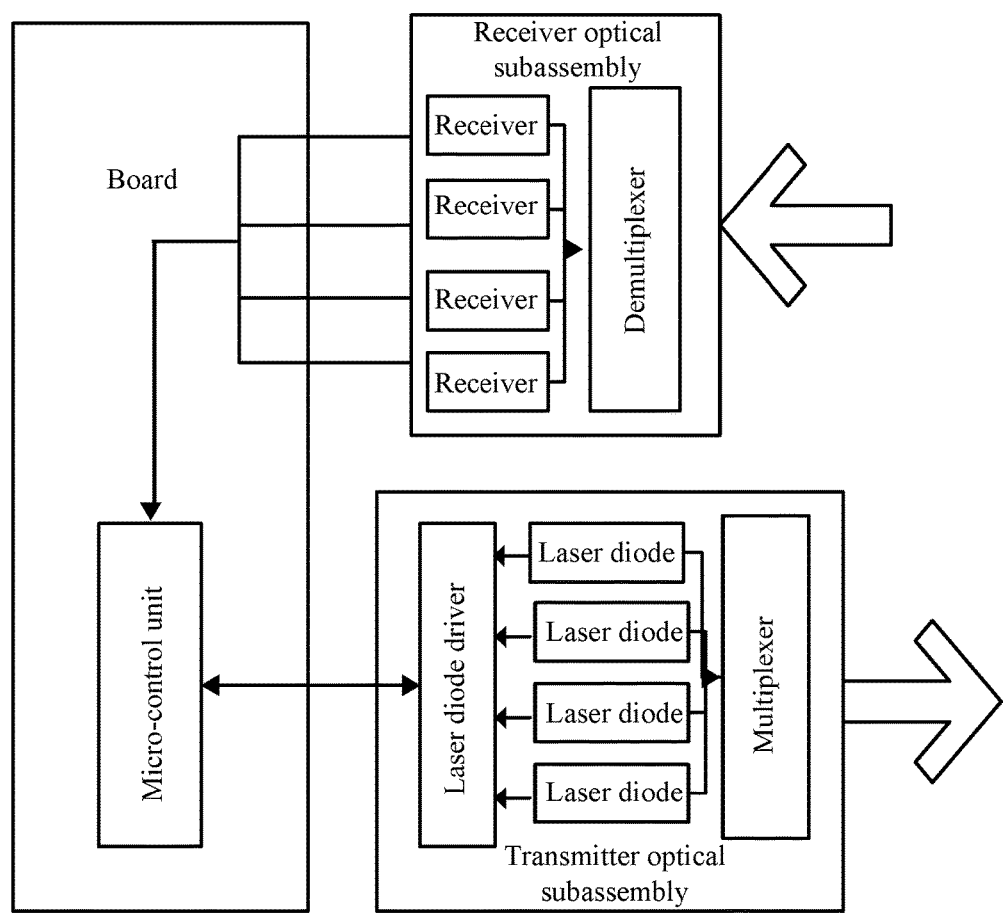
FIG. 1 is a schematic structural diagram of a transmitter component with a rate of 40 Gbps in the prior art.
Figure 2:
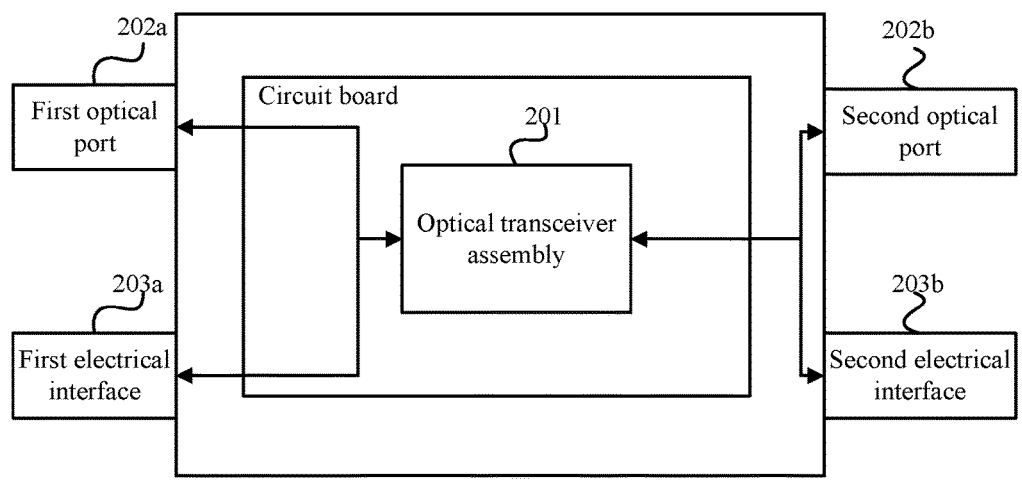
FIG. 2 is a schematic structural diagram of an optical module according to Embodiment 1 of the present invention.

As shown in FIG. 2, to implement cascading of multiple optical modules in the embodiments, this embodiment of the present invention provides an optical module that is applied to a passive optical network. A circuit board of the optical module is provided with an optical transceiver assembly 201, an optical port, and an electrical interface, where the optical port specifically includes a first optical port 202a and a second optical port 202b, and the electrical interface includes a first electrical interface 203a and a second electrical interface 203b;

the first electrical interface 203a is configured to connect an electrical interface of a board or a second electrical interface of another optical module, and the second electrical interface 203b is configured to connect a first electrical interface of another optical module;

the first optical port 202a is configured to connect an optical transmission device or a second optical port of another optical module, and the second optical port 202b is configured to connect an optical receiving device or a first optical port of another optical module; and after being input into the optical transceiver assembly 201 through the first optical port 202a, downstream incident light is multiplexed, by using the optical transceiver assembly 201, with light that is generated by the optical transceiver assembly 201, and downstream light formed by multiplexing is output through the second optical port 202b; and after upstream incident light is input into the optical transceiver assembly 201 through the second optical port 202b, light corresponding to a wavelength of the optical module is filtered out by using the optical transceiver assembly 201, and upstream light remaining after filtering is output through the first optical port 202a.

Optionally, in specific use, the first electrical interface may be an edge connector, and the second electrical interface is an electrical interface that is electrically connected to the edge connector or another optical device.

In this embodiment, to achieve an effect of downstream multiplexing and upstream demultiplexing, the optical port may be provided according to the following two manners, which are specifically:

A. Two optical ports are disposed on one optical module, and are configured to receive light and output light that is processed by the optical module respectively (the two optical ports may be a male optical port and a female optical port respectively); and B. Four optical ports are disposed on one optical module, that is, the first optical port contains a first upstream optical port and a first downstream optical port, and the second optical port contains a second upstream optical port and a second downstream optical port, where after being input into the optical transceiver assembly through the first downstream optical port, the downstream incident light is multiplexed with the light that is generated by the optical transceiver assembly, and the downstream light formed by multiplexing is output through the second downstream optical port; and after the upstream incident light is input into the optical transceiver assembly through the second upstream optical port, the light corresponding to the wavelength of the optical module is filtered out by using the optical transceiver assembly, and the upstream light remaining after filtering is output through the first upstream optical port.

With respect to the foregoing functions of the optical transceiver assembly 201, the optical module provided in this embodiment of the present invention may be implemented in multiple manners. Optional manners include the following ones:

Embodiment 2

Figure 3:
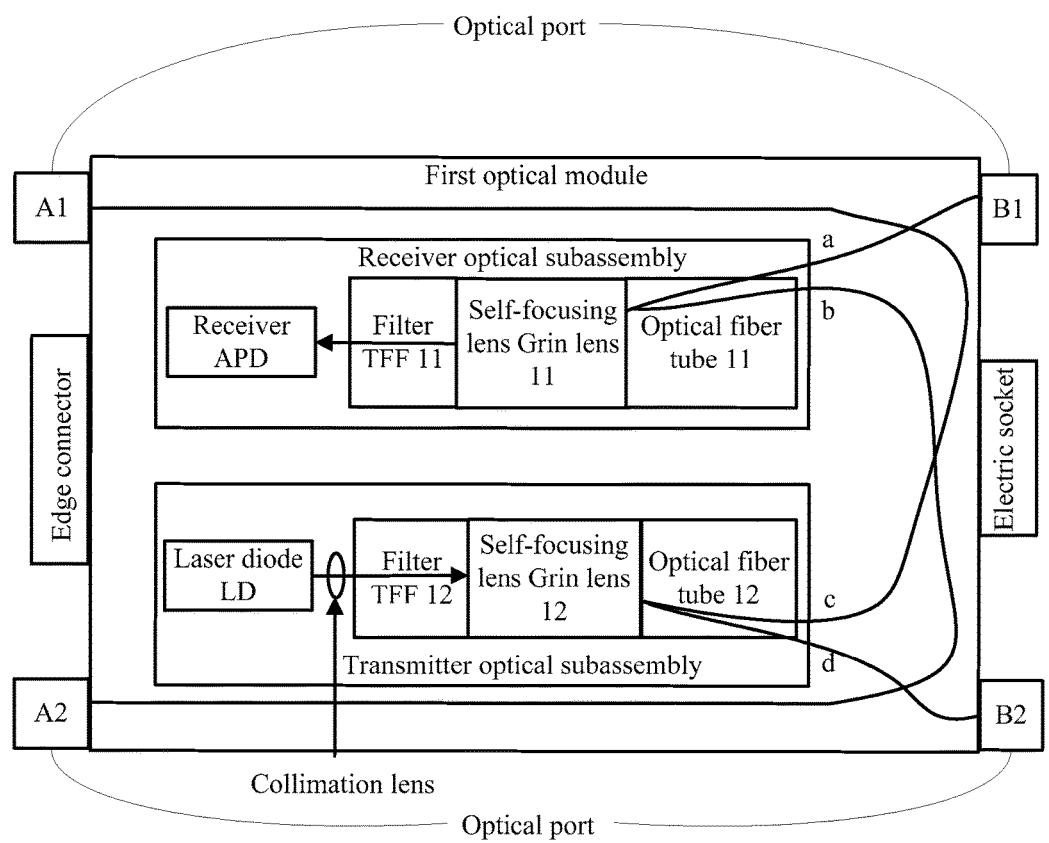
FIG. 3 is a schematic structural diagram of specific implementation of a first type of optical module according to Embodiment 2 of the present invention.

As shown in FIG. 3, the optical module has four optical ports and the optical transceiver assembly 201 comprises a receiver optical subassembly and a transmitter optical subassembly. A structure of the optical module is:

the first optical port is A1 and A2 in FIG. 3, and the second optical port is B1 and B2 in FIG. 3, where the receiver optical subassembly and the transmitter optical subassembly are separately connected to one optical port by using an optical fiber (such as a, b, c, and d in FIG. 3).

In this embodiment, the transmitter optical subassembly includes a semiconductor laser diode (Laser Diode, LD), a collimation lens, a filter (TFF 12), a self-focusing lens (Grin lens 12), an optical fiber tube, and two optical fibers (which are a first optical fiber c and a second optical fiber d respectively) that are provided in the optical fiber tube, where the two optical fibers are connected to the first downstream optical port and the second downstream optical port respectively;

after being led to the Grin lens 12 through the first optical fiber c in the optical fiber tube, downstream incident light of a first wavelength enters the TFF 12;

the LD emits light of a second wavelength, and the light of the second wavelength enters the TFF 12 in a collimated manner through the collimation lens; and the TFF 12 multiplexes the light of the second wavelength and the light of the first wavelength to form downstream light, and the downstream light is output through the second optical fiber d of the two optical fibers by using the Grin lens 12 and the optical fiber tube.

The receiver optical subassembly includes a receiver APD, a filter TFF 11, and a self-focusing lens Grin lens 11, an optical fiber tube 11, and two optical fibers (which are a third optical fiber a and a fourth optical fiber b) that are provided in the optical fiber tube.

Upstream incident light enters the receiver optical subassembly through a second upstream optical port that is connected to the third optical fiber a, and enters the TFF 11 after being led to the Grin lens. The TFF 11 can pass only light of a wavelength specified by the optical module; therefore, the TFF 11 passes light that is in the upstream incident light and that corresponds to the wavelength specified by the optical module. In the upstream incident light, light of another wavelength except the light of the specified wavelength is reflected by the TFF 11. The reflected light is reflected by the Grin lens to another optical fiber in the optical fiber tube, that is, the fourth optical fiber. The fourth optical fiber transmits the light of the another wavelength to the first upstream optical port for output.

In this embodiment, the transmitter optical subassembly further includes any type of case of a (10 Gbit/s Miniature Device, XMD) case, a transistor outline (Transistor Outline, TO) case, and an integral case. The LD, the collimation lens, the TFF, the Grin lens, the optical fiber tube, and the two optical fibers that are provided in the optical fiber tube are packaged in the any type of case.

Embodiment 3

Figure 4:
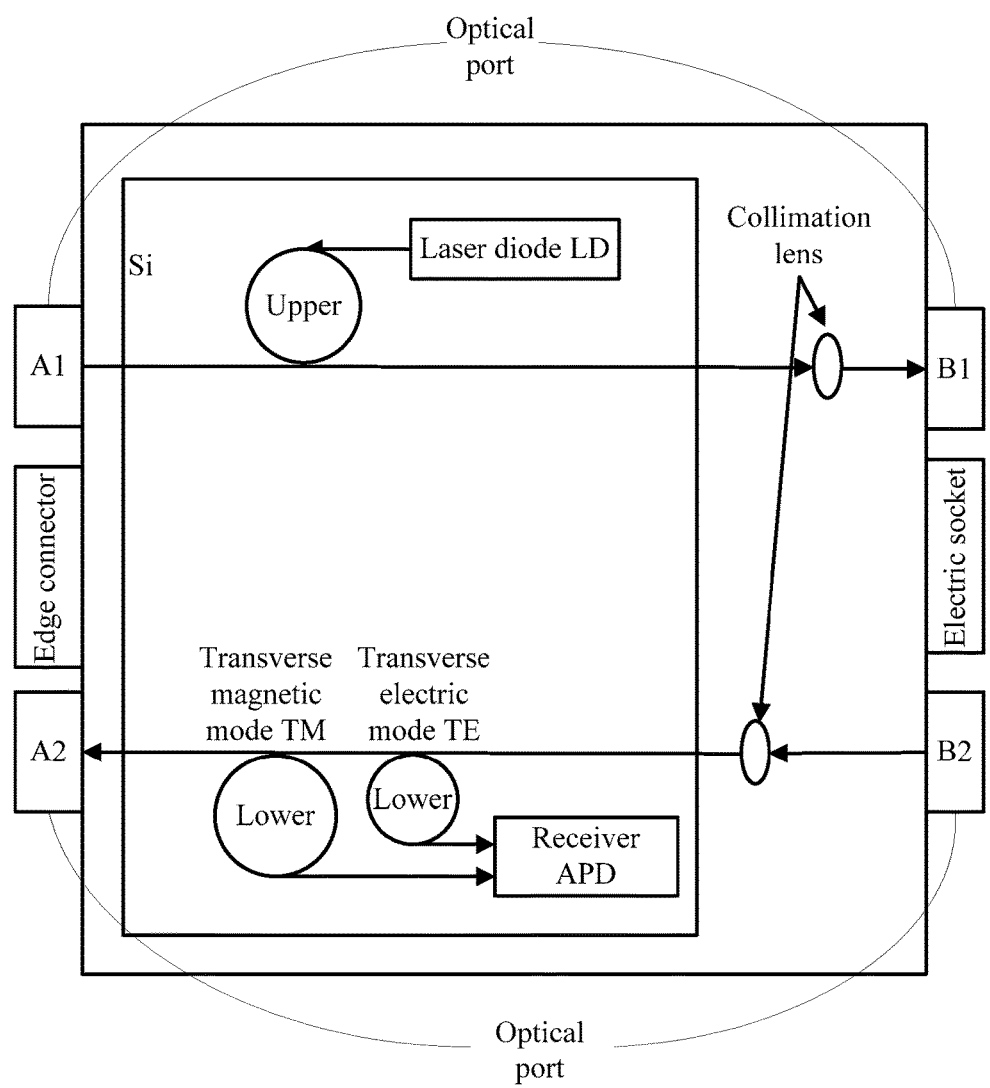
FIG. 4 is a schematic structural diagram of specific implementation of a first type of optical module according to Embodiment 3 of the present invention.

As shown in FIG. 4, the optical module includes four optical ports, where the first optical port contains a first upstream optical port and a first downstream optical port, and the second optical port contains a second upstream optical port and a second downstream optical port. After being input into the optical transceiver assembly through the first downstream optical port, downstream incident light is multiplexed with light that is generated by the optical transceiver assembly. Downstream light formed by multiplexing is output through the second downstream optical port. After upstream incident light is input into the optical transceiver assembly through the second upstream optical port, light corresponding to the wavelength of the optical module is filtered out by using the optical transceiver assembly. Upstream light remaining after filtering is output through the first upstream optical port.

Further, the optical module further includes a wavelength division multiplexer (Wavelength Division Multiplexing, WDM). Specific constituents of the optical transceiver assembly 201 in the optical module include a semiconductor laser diode LD, a receiver APD, and a silicon microring resonator, where after entering a first microring through an upper semi-ring of the first microring in the silicon microring resonator, light of a second wavelength emitted by the LD is transmitted to a first straight line that is connected to a lower semi-ring of the first microring, and is multiplexed with downstream incident light of a first wavelength, and after being reflected to the second downstream optical port by using the collimation lens, light obtained by multiplexing enters the WDM and is output, where the downstream incident light of the first wavelength is input to the first straight line of the optical module through the first downstream optical port; and upstream incident light is reflected by the WDM to the second upstream optical port and enters the optical module, the collimation lens in the optical module reflects the upstream incident light to a second straight line in the silicon microring resonator, and a second microring and a third microring in the silicon microring resonator that are connected to the second straight line correspondingly pass light, of a third wavelength corresponding to the wavelength of the optical module, formed by a transverse electric mode TE wave and a transverse magnetic mode TM wave, and send the light of the third wavelength to the APD for receiving, where light of another wavelength except the light of the third wavelength in the upstream light is reflected by the second straight line in the microring to the first upstream optical port for output.

Embodiment 4

Figure 5:
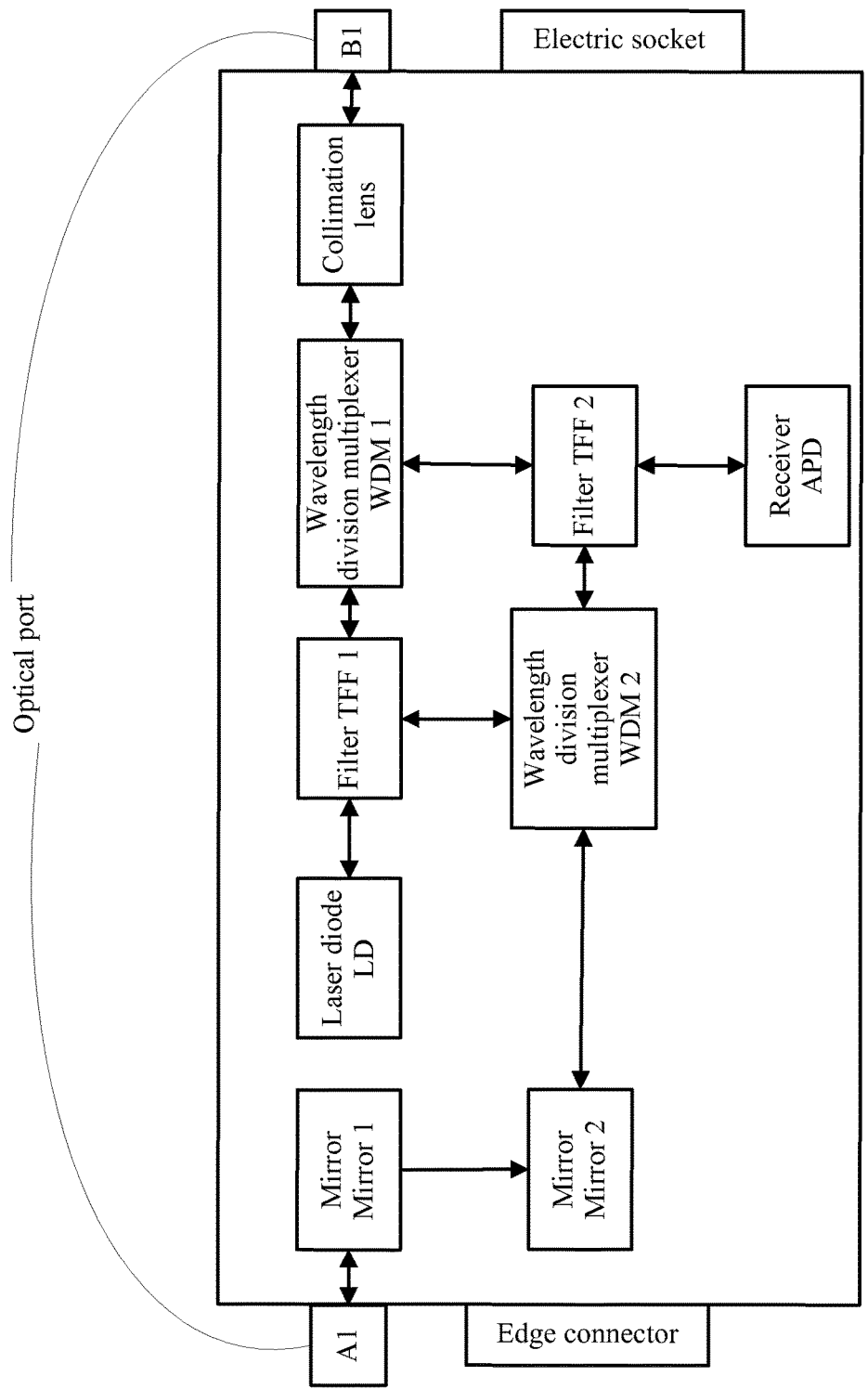
FIG. 5 is a schematic structural diagram of specific implementation of a first type of optical module according to Embodiment 4 of the present invention.

As shown in FIG. 5, the optical module includes two optical ports: a first optical port A1 and a second optical port B1. Specific constituents of the optical transceiver assembly 201 in the optical module include two wavelength division multiplexers (a first wavelength division multiplexer (WDM 1) and a second wavelength division multiplexer (WDM 2)), an LD, two filters (a filter TFF 1 and a filter TFF 2), a receiver (APD), and mirrors (a mirror 1 and a mirror 2), where when entering the optical module through the first optical port and being reflected by the mirror to the TFF 1, downstream incident light of a first wavelength is reflected, and is multiplexed with light of a second wavelength generated by the LD, and after entering the WDM 1, downstream light formed by multiplexing is projected to the second optical port for output; and after upstream incident light enters the optical module through the second optical port, the upstream incident light is reflected to the TFF 2 by using the WDM 1, and the TFF 2 passes light of a third wavelength corresponding to a wavelength of the optical module and sends the light of the third wavelength to the APD for receiving, where after being reflected by the TFF 2, light of another wavelength except the light of the third wavelength in the upstream incident light is reflected by the WDM 2 and the mirror to the first optical port for output.

Embodiment 5

Figure 6:
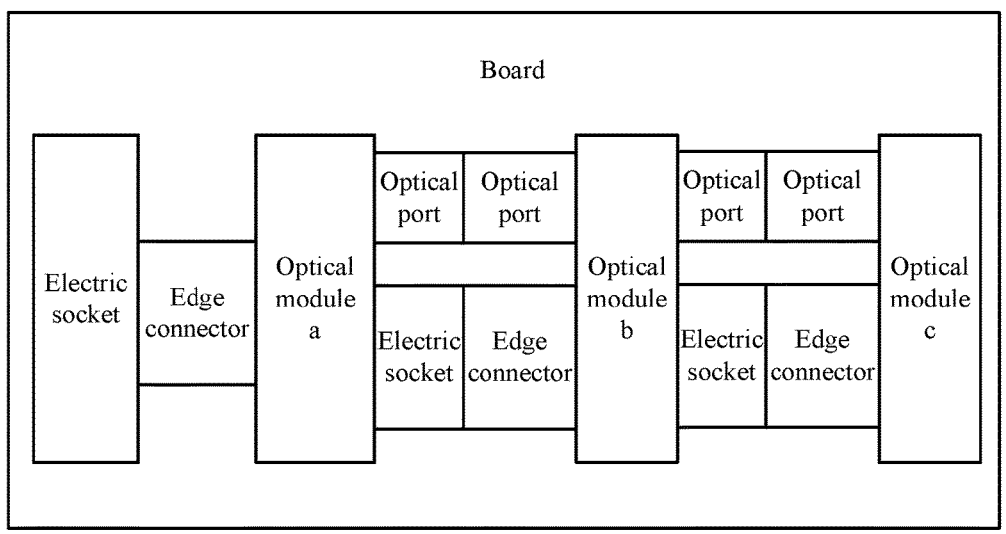
FIG. 6 is a schematic structural diagram of a bandwidth adjustable optical module according to Embodiment 5 of the present invention.

As shown in FIG. 6, in order to form a bandwidth adjustable optical module, the foregoing optical modules in various structures may be cascaded. Therefore, an optical module included in the bandwidth adjustable optical module is any type of the optical modules in various structures in the foregoing embodiments. The bandwidth adjustable optical module in this embodiment includes: in the embodiment, the first electrical interface may be an edge connector, and the second electrical interface is an electrical interface that is electrically connected to the edge connector or another optical device.

At least two optical modules, where the at least two optical modules are connected to each other by using the first electrical interface, the second electrical interface, the first optical port, and the second optical port, and of two connected optical modules, an optical port and an electrical interface of one optical module are interconnected to an optical port and an electrical interface of the other optical module respectively.

The optical modules mentioned in the bandwidth adjustable optical module provided in this embodiment may be formed by cascading multiple optical modules of each type of the foregoing three types of optical modules in different structures. Then, specific implementation of the bandwidth adjustable optical module may be as follows:

Embodiment 6

Figure 7:
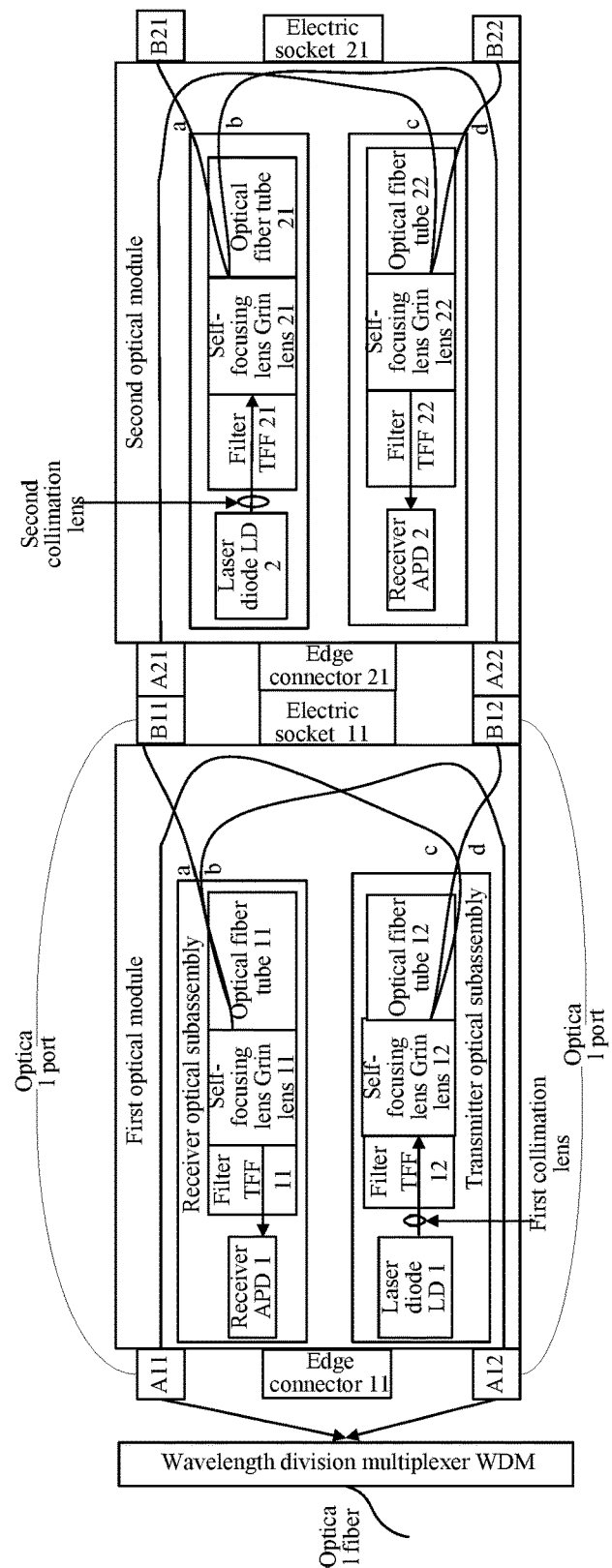
FIG. 7 is a schematic structural diagram of a bandwidth adjustable optical module according to Embodiment 6 of the present invention.

A specific structure shown in FIG. 3 is used to form the bandwidth adjustable optical module by means of cascading. The optical module further includes a wavelength division multiplexer WDM. The wavelength division multiplexer is disposed on the board and is connected to the transceiver optical assembly. An example in which two optical modules are cascaded is used in this embodiment (as shown in FIG. 7). For the cascading, second optical ports (B11 and B12 in FIG. 7) of a first optical module are interconnected to first optical ports (A21 and A22 in FIG. 7) of a second optical module, so as to implement optical signal transmission; a first electrical interface of the second optical module is interconnected to a second electrical interface of the first optical module, so as to implement electrical signal transmission. In this embodiment, the first electrical interface may be an electric socket 11, and the second electrical interface may be an edge connector 21. When the first optical module and the second optical module are interconnected, the edge connector 21 is plugged into the electric socket 11. Electrical signal transmission between the first optical module and the second optical module is implemented by means of interconnection of the edge connector 21 and the electric socket 11.

According to a cascading structure shown in FIG. 7, detailed descriptions are given on how the bandwidth adjustable optical module provided in this embodiment implements multiplexing and demultiplexing. Specific implementation is as follows:

Downstream Multiplexing:

A laser diode LD 1 in the first optical module emits light of a first wavelength. The light of the first wavelength enters a filter TFF 12 of the first optical module in a collimated manner through a first collimation lens, then is reflected by a self-focusing lens Grin lens 12 in the first optical module to an optical fiber d in an optical fiber tube 12, and enters the second optical module through the optical port B12 of the first optical module and the optical port A22 of the second optical module.

After entering the second optical module through the optical port A22, the light of the first wavelength enters a self-focusing lens Grin lens 21 in a transmitter optical subassembly of the second optical module through an optical fiber b in the second optical module, and then is reflected to a filter TFF 21 of the second optical module.

A laser diode LD 2 in the second optical module emits light of a second wavelength. The light of the second wavelength passes through a filter TFF 21 of the second optical module in a collimated manner by using a second collimation lens. A filter in each transmitter optical subassembly and each receiver optical subassembly can pass only light of a particular wavelength (that is, the TFF 21 can pass only the light of the second wavelength emitted by the LD 2 in this embodiment, and light of other wavelengths is all reflected); therefore, after arriving at the TFF 21, the light of the first wavelength previously input by the first optical module is reflected and is thereby multiplexed with the passed light of the second wavelength. Then, downstream light formed by multiplexing is output to an optical port B21 of the second optical module through the Grin lens 21 and an optical fiber a in the optical fiber tube 21.

Upstream Demultiplexing:

After entering the second optical module through an optical port B22 of the second optical module, upstream incident light (for the convenience of explanation in this embodiment, the upstream incident light may include light of the first wavelength and light of the second wavelength, the light of the first wavelength is received by a receiver of the second optical module, and the light of the second wavelength is received by a receiver of the first optical module) enters a self-focusing lens Grin lens 22 of a receiver optical subassembly of the second optical module through an optical fiber d and then is reflected to a filter TFF 22. The TFF 22 can pass only light of the first wavelength; therefore, the light of the first wavelength is transmitted through the TFF 22 and is received by a receiver APD 2. After being reflected by the TFF 22, the light of the second wavelength in the upstream light is reflected by the Grin lens 22 to an optical fiber c of the second optical module.

The optical fiber c of the second optical module is connected to the optical port A21 of the second optical module, and the optical port A21 of the second optical module is interconnected to the optical port B11 of the first optical module; therefore, by using this interconnection, the light of the second wavelength enters an optical fiber a of the first optical module.

In the first optical module, after being received by using the optical fiber a, the light of the second wavelength arrives at a filter TFF 11 through a self-focusing lens Grin lens 11. The TFF 11 can pass only light of the second wavelength; therefore, the light of the second wavelength is transmitted through the TFF 11 after being reflected to the TFF 11, and then is received by a receiver APD 1.

Embodiment 7

Figure 8:
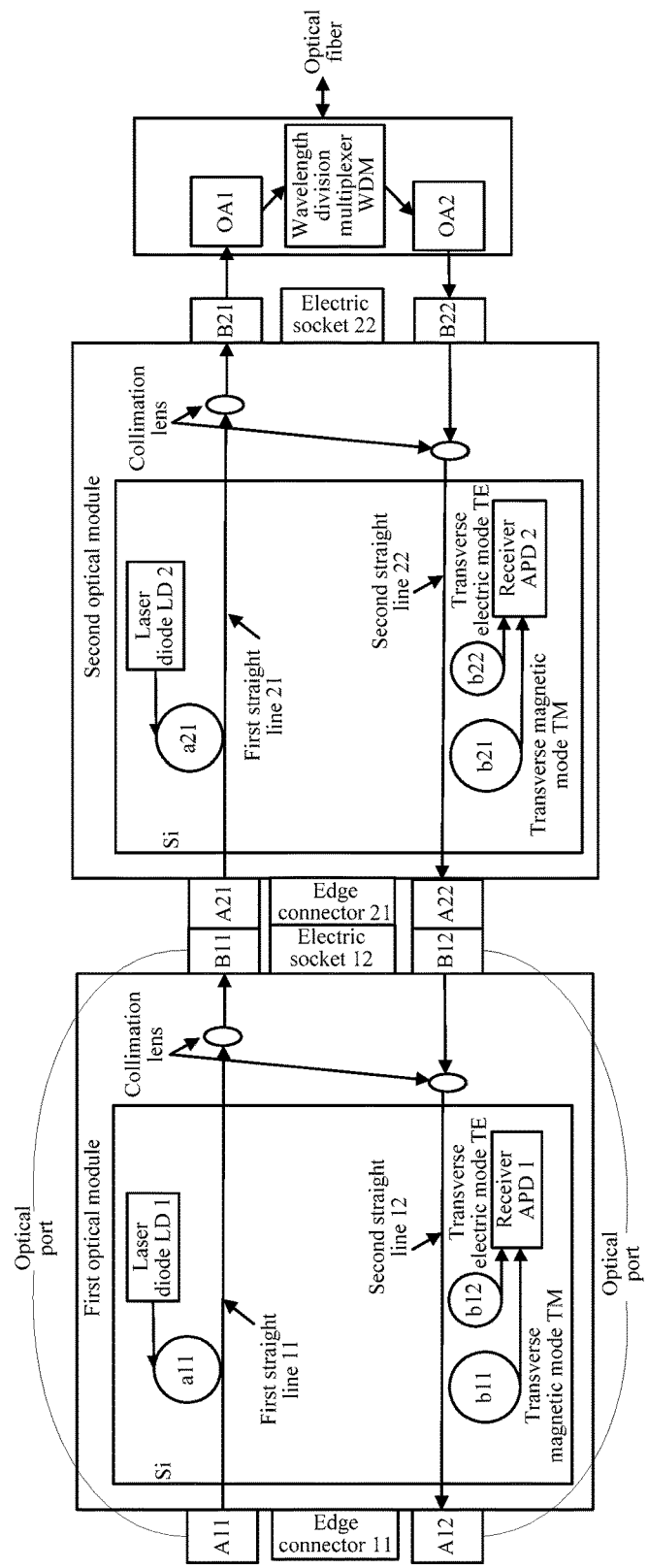
FIG. 8 is a schematic structural diagram of a bandwidth adjustable optical module according to Embodiment 7 of the present invention.

A specific structure shown in FIG. 4 is used to form the bandwidth adjustable optical module through cascading. An example in which two optical modules are cascaded is used in this embodiment (as shown in FIG. 8). For the cascading, second optical ports (an optical port B11 and an optical port B12 in FIG. 8) of a first optical module are interconnected to first optical ports (an optical port A21 and an optical port A22 in FIG. 8) of a second optical module, so as to implement optical signal transmission; a first electrical interface of the second optical module is interconnected to a second electrical interface of the first optical module, so as to implement electrical signal transmission. In this embodiment, the first electrical interface may be an electric socket 12, and the second electrical interface may be an edge connector 21. When the first optical module and the second optical module are interconnected, the edge connector 21 is plugged into the electric socket 12. Electrical signal transmission between the first optical module and the second optical module is implemented by means of interconnection of the edge connector 21 and the electric socket 11.

According to a cascading structure shown in FIG. 8, detailed descriptions are given on how the bandwidth adjustable optical module provided in this embodiment implements multiplexing and demultiplexing. Specific implementation is as follows:

Downstream:

In the first optical module, after entering a microring a11 by using an upper semi-ring of the microring a11 in a silicon microring resonator, light of a first wavelength emitted by an LD 1 is transmitted to a first straight line 11 that is connected to a lower semi-ring of the microring a11. The first straight line 11 leads the light to a collimation lens. The collimation lens reflects the light of the first wavelength to the optical port B11. The optical port B11 is interconnected to the optical port A21 of the second optical module. The light of the first wavelength that is transmitted to the first straight line 11 is transmitted to the second optical module through the interconnected optical ports (B11 and A21).

In the second optical module, the light of the first wavelength that is received through the optical port A21 is transmitted to a microring a21 in a silicon microring resonator in the second optical module by using a first straight line 21 in the second module that is connected to the A21.

Light of a second wavelength emitted by an LD 2 enters an upper semi-ring of a microring a21 and moves to a lower semi-ring to be multiplexed with the light of the first wavelength in the first straight line. Downstream light obtained by multiplexing is reflected by a collimation lens to the optical port B21, and then enters, by using an OA1 that is connected to the optical port B21, a WDM for output.

Upstream:

After passing through the WDM, upstream incident light (the upstream incident light includes light of the first wavelength that is corresponding to the first optical module and light of the second wavelength that is corresponding to the second optical module) is reflected to a corresponding optical port B22 by using an OA2. After entering the second optical module through B22, the upstream light enters a silicon microring resonator that is disposed in the second optical module. A second straight line 22 that is disposed in the silicon microring resonator is used to transmit upstream light. Therefore, the upstream light is reflected by the collimation lens to the second straight line 22 in the silicon microring resonator. A second microring b21 and a third microring b22 in the silicon microring resonator that are connected to the second straight line pass light, of a second wavelength corresponding to the wavelength of the optical module, formed by a transverse electric mode TE wave and a transverse magnetic mode TM wave (where a transverse electric mode TE wave and a transverse magnetic mode TM wave that are of the second wavelength form the light of the second wavelength through combination), and send the light of the second wavelength to the APD 2 for receiving. Light of another wavelength except the light of the second wavelength in the upstream light is output to the first optical module by using the second straight line in the microring.

After the upstream light in which the second wavelength is passed enters the first module, light of the first wavelength that is corresponding to a wavelength specified in the first optical module is passed by using a silicon microring resonator, a collimation lens, and so on in the first optical module in a same manner as that used in the second module. The passed light of the first wavelength is received by using a receiver APD 1.

Embodiment 8

Figure 9:
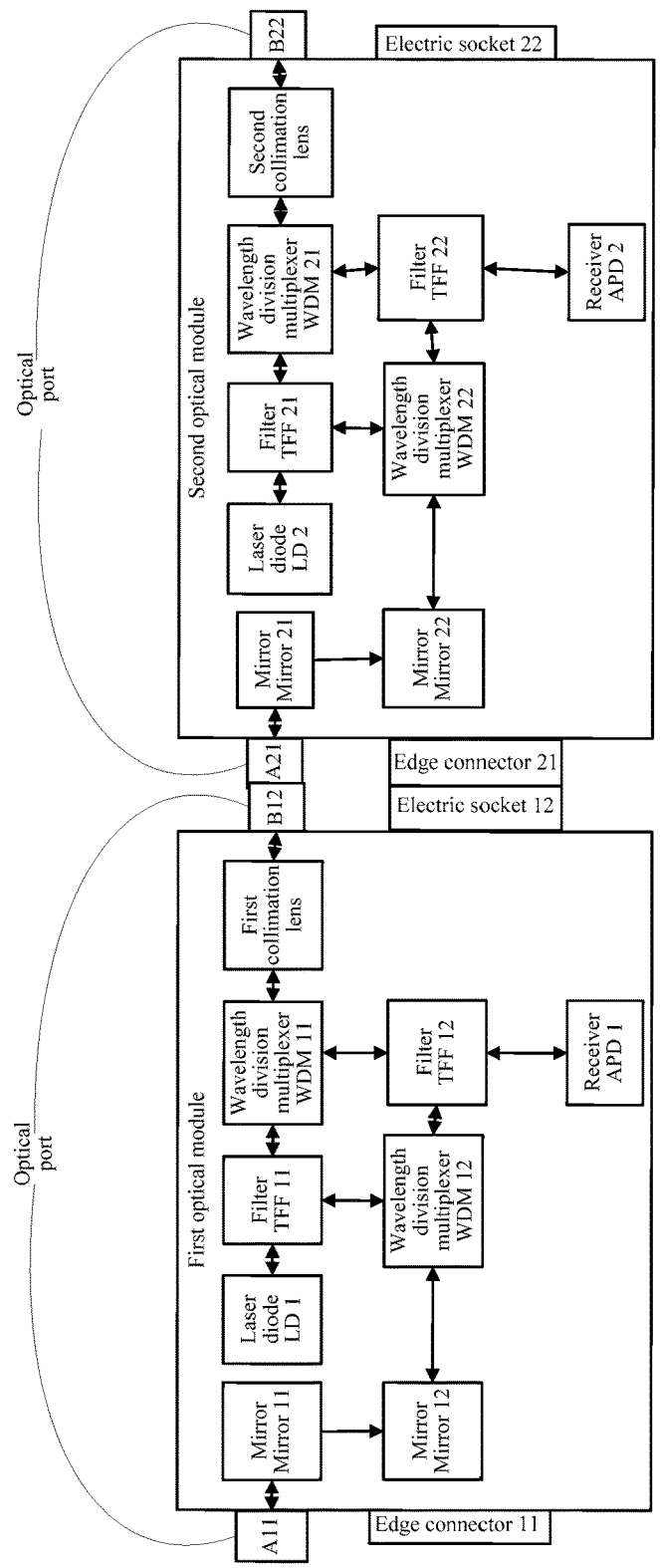
FIG. 9 is a schematic structural diagram of a bandwidth adjustable optical module according to Embodiment 8 of the present invention.

A specific structure shown in FIG. 5 is used to form the bandwidth adjustable optical module through cascading. An example in which two optical modules are cascaded is used in this embodiment (as shown in FIG. 9). For the cascading, a second optical port (an optical port B12) of a first optical module is interconnected to a first optical port (an optical port A21) of a second optical module, so as to implement optical signal transmission; an edge connector of the second optical module is plugged into an electrical interface of the first optical module, so as to implement electrical signal transmission.

According to a cascading structure shown in FIG. 9, detailed descriptions are given on how the bandwidth adjustable optical module provided in this embodiment implements multiplexing and demultiplexing. Specific implementation is as follows:

In this embodiment, for the convenience of description about an optical signal processing procedure of the optical module, functions of components in the optical module are described herein first. Components in the first optical module are used as an example: a WDM 11, which passes a downstream wavelength and reflects an upstream wavelength; a WDM 12, which reflects a downstream wavelength and passes an upstream wavelength; a TFF 11, which, in the downstream, passes light of a specified wavelength that is generated by an LD 1 in the first optical module, and reflects light emitted by an LD of another module; and a TFF 12, which, in the upstream, passes light of the specified wavelength that is received by the first optical module, and reflects light received by another module.

An example in which the second optical module is cascaded (or referred to as being plugged) to the first optical module is used in this embodiment (as shown in FIG. 9) to describe in detail how the bandwidth adjustable optical module provided in this embodiment implements multiplexing and demultiplexing. Specific implementation is as follows:

Downstream Multiplexing:

In the first optical module, light of a first wavelength emitted by the LD 1 is transmitted through the TFF 11 and enters the WDM 11 that separates downstream light and upstream light, and then enters an optical interface (an optical interface that is formed by connecting an optical port B12 and an optical port A21) that connects the two optical modules, so as to enter the second optical module. In the second optical module, the light of the first wavelength is reflected by a mirror 22 and a WDM 22 to a TFF 21 in the second optical module. The TFF 21 in the second optical module passes only light of a second wavelength emitted by an LD 2 and reflects the light of the first wavelength emitted by the LD 1; therefore multiplexing is performed on the light of the second wavelength and the light of the first wavelength at the TFF 21. Light formed by multiplexing enters a WDM 21 and finally is reflected by a second collimation lens to an optical port B22 for output.

Upstream Demultiplexing:

After entering the second optical module through the optical port B22, upstream incident light (for the convenience of explanation in this embodiment, the upstream incident light may be light that includes light of the first wavelength and light of the second wavelength, the light of the second wavelength is received by a receiver of the second optical module, and the light of the first wavelength is received by a receiver of the first optical module) is transmitted to the WDM 21 by the second collimation lens. Then, the WDM 21 reflects an upstream wavelength to a TFF 22. The TFF 22 passes light of a corresponding wavelength which is received by an APD 2. Another wavelength is reflected by the TFF 22, passes through a WDM 22, is reflected by a mirror 22 and a mirror 21 of the second optical module to enter the first optical module, and is reflected by the WDM 11 in the first optical module. The TFF 12 passes light of the first wavelength which is received by an APD 1.

Embodiment 9

Figure 10:
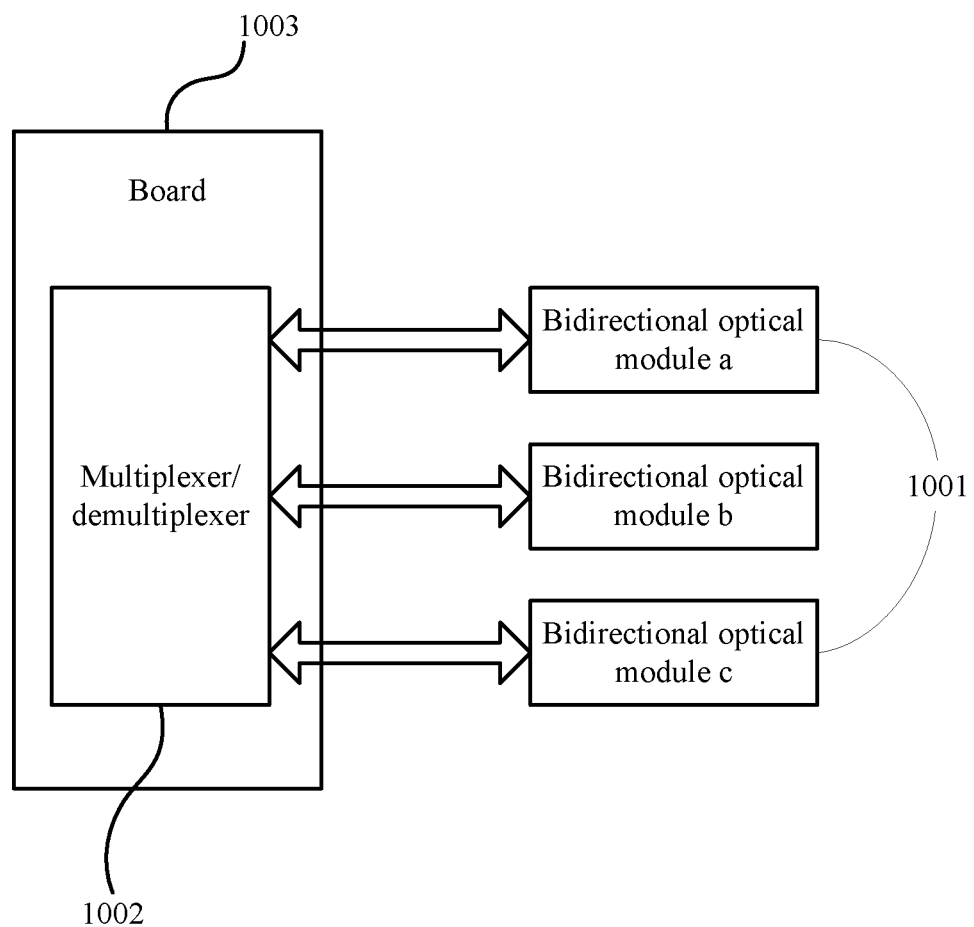
FIG. 10 is a schematic structural diagram of a bandwidth adjustable optical module according to Embodiment 8 of the present invention.

As shown in FIG. 10, multiple optical modules are combined by using a parallel arrangement method to form a bandwidth adjustable optical module. The bandwidth adjustable optical module includes at least two bidirectional optical transceiver modules 1001, an optical multiplexer/demultiplexer 1002 and a board 1003, where the multiplexer/demultiplexer 1002 is disposed on the board 1003 and separately connected to the at least two bidirectional optical transceiver modules 1001, demultiplexes an optical signal input into the at least two bidirectional optical transceiver modules 1001, sends optical signals obtained by demultiplexing to corresponding bidirectional optical transceiver modules, receives optical signals output by the at least two bidirectional optical transceiver modules, multiplexes the received optical signals, and outputs an optical signal obtained by multiplexing through an optical fiber.

Embodiment 3

An embodiment of the present invention further provides another bandwidth adjustable optical module that is applied to a passive optical network. The bandwidth adjustable optical module is internally provided with at least one optical sub-module that provides a unit bandwidth, and includes two external optical ports and two external electrical interfaces, where the external optical port and the external electrical interface may be connected to a new optical sub-module in a pluggable manner, when a new optical sub-module is connected, the new optical sub-module and the optical sub-module originally in the bandwidth adjustable optical module are combined to form a bandwidth of the bandwidth adjustable optical module, where the bandwidth is a sum of a bandwidth provided by the new optical sub-module and a bandwidth of the original optical sub-module.

Figure 11:
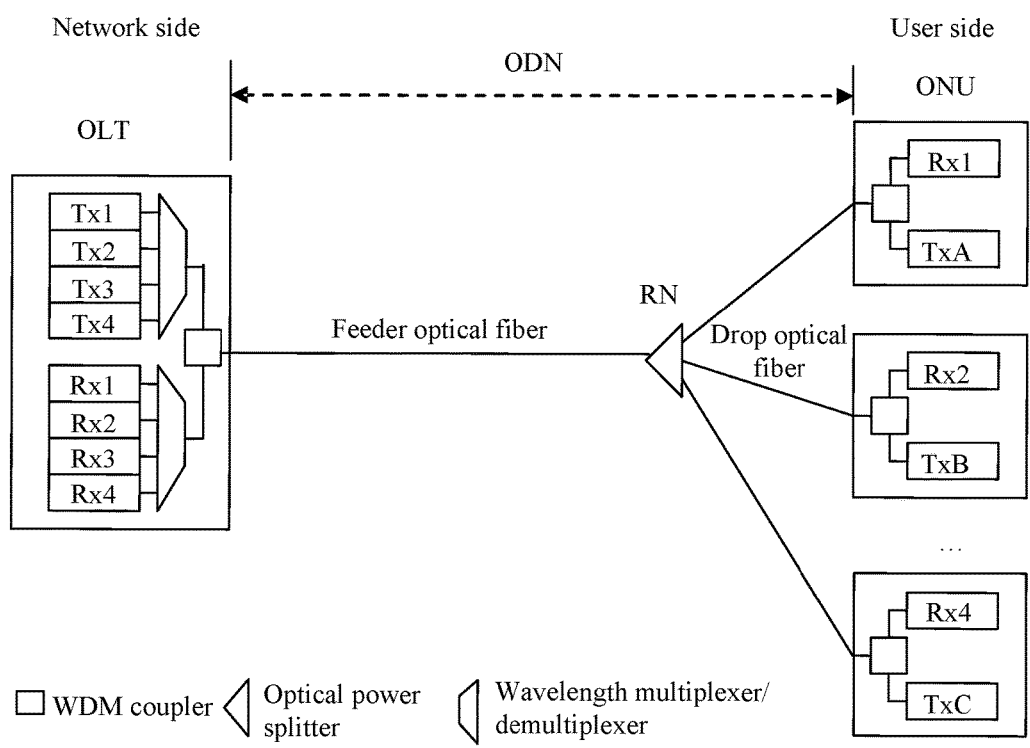
FIG. 11 is a schematic diagram of a passive optical network system according to Embodiment 9 of the present invention.

Embodiment 9 of the present invention provides a passive optical network system, as shown in FIG. 11.

The passive optical network system includes an optical line terminal (Optical Line Terminal, OLT), an optical network unit (Optical Network Unit, ONU), and an optical distribution network (Optical Distribution Network, ODN). The OLT is connected to at least one ONU by using the ODN. The OLT includes the optical module described in Embodiment 1 to Embodiment 9 (that is FIG. 2 to FIG. 10). For detailed descriptions of the optical module, refer to corresponding optical modules in the foregoing embodiments, which are not described herein again.

Specifically, a structure of the passive optical network system is described by using a TWDM-PON as an example. A TWDM-PON consists of a network-side OLT, a user-side ONU or ONT (Optical Network Terminal, optical network terminal), and an ODN. A passive optical network generally uses a tree topology. A typical TWDM-PON network architecture is shown in FIG. 11. The architecture is used as an example for explanation in the following.

An OLT provides a network side interface for a PON system, and is connected to one or more ODNs. The ODN is a passive optical splitting component, is configured to connect an OLT device and an ONU or optical network terminal (Optical Network Terminal, ONT) device, and is configured to distribute or multiplex data signals between the OLT and the ONU or ONT. An ONU provides a user side interface for the PON system, and is connected to an ODN. If an ONU directly provides a user port function, such as an Ethernet user port used on a PC for Internet access, the ONU is referred to as an ONT. Unless otherwise specified, the ONU mentioned in the following refers to the ONU and the ONT collectively. In FIG. 11, an example is used, in which the OLT contains four optical transmitters Tx1-Tx4 and four receivers Rx1-Rx4.

In a TWDM-PON system, a direction from an OLT to an ONU is referred to as the downstream; the opposite direction from the ONU to the OLT is referred to as the upstream. There are multiple (≥1) wavelengths in both the upstream direction and the downstream direction. It is assumed that in FIG. 11, there are four wavelengths in both the upstream and the downstream, where the four wavelengths coexist in a WDM manner and do not interfere with each other.

In the downstream direction, the four optical transmitters Tx1-Tx4 of the OLT broadcast downstream data by using optical signals of different wavelengths respectively. The optical signals are output to a feeder optical fiber of an ODN after passing through a wavelength multiplexer/demultiplexer and a WDM coupler, and are transmitted to ONUs by the ODN. The ONU uses an adjustable receiver and receives the downstream broadcast data signal over one downstream wavelength of the four wavelengths.

In the upstream direction, the adjustable receiver of the ONU uses one upstream wavelength of the four wavelengths to transmit an optical burst signal in a TDMA (Time Division Multiple Access, time division multiple access) manner. The optical burst signal arrives at the OLT through the feeder optical fiber of the ODN, and passes through the WDM coupler and the wavelength demultiplexer of the OLT. Optical signals of different wavelengths are received by the four different receivers Rx1-Rx4 respectively. The ONUs that use a same upstream wavelength transmit data in a TDMA manner. That is, the OLT assigns a timeslot to each ONU. Each ONU must send data strictly according to the timeslot assigned by the OLT, so as to ensure that no conflict occurs in the upstream data.

In an actual TWDM-PON network, a possible network topology may be: there is one OLT chassis (chassis) with multiple PON ports (port) disposed on one line card (line card) and connected to an ODN by using a wavelength multiplexing component; or there is one OLT chassis and multiple line cards, with at least one PON port on each line card, and multiple PON ports are connected to an ODN by using a wavelength multiplexing component; or there are at least two OLT chassises, each OLT chassis has multiple line cards, each line card has at least one PON port, and multiple PON ports are connected to an ODN by using a wavelength multiplexing component.

An OLT line card has two types of ports. One is a network side port and is connected to an ETH (Ethernet, Ethernet) network, or an IP network, or an asynchronous transfer mode (Asynchronous Transfer Mode, ATM)/synchronous digital hierarchy (synchronous digital hierarchy, SDH) network. The other is a PON port and is connected to an ONU by using an ODN. Different PON ports on a same OLT line card may perform communication by using a bus inside the OLT line card. Different OLT line cards on a same OLT chassis may perform communication by using their network-side ports and a backplane bus of the chassis. OLT line cards of different OLT chassises may perform communication by using an ETH network, or IP network, or ATM network, or the like that is connected to the chassises.

The OLT includes at least four optical modules. Each optical module at least includes one optical transceiver assembly. The optical transceiver assembly at least includes one optical transmitter (that is, the transmitter optical subassembly mentioned in the embodiments of the present invention) and at least one receiver optical subassembly (that is, the receiver optical subassembly mentioned in the embodiments of the present invention). For example, an optical module 1 at least includes an optical transmitter Tx1 and an optical receiver Rx1. For a specific structure of the optical module, refer to the optical module described in Embodiment 1 to Embodiment 8 (that is FIG. 2 to FIG. 10). For detailed descriptions of the optical module, refer to corresponding optical modules in the foregoing embodiments, which are not described herein again.

The foregoing one or more technical solutions in the embodiments of this application at least have the following technical effects:

The optical module provided in the solutions of the present invention can be flexibly combined with another optical module, enabling flexible and gradual upgrade of an optical module bandwidth according to a user requirement by using various combination manners.

Compared with a 40G TWDN PON module, all costs are evenly distributed to each module in this solution. A quantity of modules deployed is a quantity of modules required by a supplier, and costs are reduced.

Compared with integrating a 40G TWDN PON module, using DWDM TOSAs and DWDM ROSAs as optical sub-assemblies is easy for manufacturing and achieves higher productivity and lower costs.

The optical module according to the embodiments of the present invention can be used independently or several optical modules can be combined for use. Each optical module can provide a particular bandwidth. A bandwidth formed by combining multiple optical modules is a sum of bandwidths provided by the multiple optical modules. In the optical module provided in the embodiments of the present invention, an optical module with a rate of 10 Gbps rate may be provided in a board first. When upgrade is needed because a bandwidth is not sufficient for use, another optical module with a rate of 10 Gbps can be provided. In this way, upgrade can be implemented gradually at low costs without the need of upgrade to 40G at a time, which avoids excessive costs caused by surplus demands and achieves pay per demand and low power consumption, and which is an implementation manner of a high-productivity 40G TWDM PON.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a portable hard drive, a read-only memory (ROM, Read-Only Memory), a random access memory (RAM, Random Access Memory), a magnetic disk, or an optical disc.

The foregoing embodiments are merely used to describe in detail the technical solutions of the present application. The descriptions of the foregoing embodiments are merely intended to help understand the method and core idea of the present invention, and shall not be construed as a limitation to the present invention. Any variation or replacement readily figured out by a person skilled in the art within the technical scope disclosed in the present invention shall fall within the protection scope of the present invention.

What is claimed is:

1. An optical module for facilitating communication in a passive optical network, wherein the optical module comprises:
    a first electrical interface and a second electrical interface;
    a first optical port and a second optical port; and
    an optical transceiver assembly;
    wherein the first electrical interface is configured to be connected to an electrical interface of a first board or an electrical interface of another optical module, and the second electrical interface is configured to be connected to an electrical interface of a second board or an electrical interface of another optical module;
    wherein the first optical port is configured to be connected to an optical transmission device or an optical port of another optical module, and the second optical port is configured to be connected to an optical receiving device or an optical port of another optical module;
    wherein the optical module is connected, via the first electrical interface and the first optical port and/or via the second electrical interface and the second optical port to at least one other optical module, so as to form an arrangement of multiple cascaded optical modules;
    wherein the optical transceiver assembly is configured to generate light and to multiplex the generated light with light input via the first optical port;
    wherein the second optical port is configured to output the multiplexed light;
    wherein the optical transceiver assembly is configured to filter light corresponding to a wavelength of the optical module out from light input through the second optical port;
    wherein the first optical port is configured to output the filtered light;
    wherein the first optical port comprises a first upstream optical port and a first downstream optical port, and the second optical port comprises a second upstream optical port and a second downstream optical port;

wherein the second downstream optical port of the second optical interface is configured to output the multiplexed light; and wherein the first upstream optical port of the second optical interface is configured to output the filtered light.

2. The optical module according to claim 1, wherein the transceiver optical assembly comprises a receiver optical subassembly and a transmitter optical subassembly, wherein the transmitter optical subassembly comprises a semiconductor laser diode (LD), a collimation lens, a thin film filter (TFF), a Grin lens, an optical fiber tube, and two optical fibers that are provided in the optical fiber tube, wherein the two optical fibers are connected to the first downstream optical port and the second downstream optical port respectively;

wherein the optical module is configured such that after being led to the Grin lens through a first optical fiber in the optical fiber tube, downstream incident light of a first wavelength enters the TFF;

wherein the LD is configured to emit light of a second wavelength, and the optical module is configured such that the light of the second wavelength enters the TFF in a collimated manner through the collimation lens; and wherein the TFF is configured to multiplex the light of the second wavelength and the light of the first wavelength to form downstream light, and the optical module is configured such that the downstream light is output through a second optical fiber of the two optical fibers by using the Grin lens and the optical fiber tube.

3. The optical module according to claim 2, wherein the transmitter optical subassembly further comprises miniature device case, a transistor outline case, or an integral case, wherein the LD, the collimation lens, the TFF, the Grin lens, and the optical fiber tube are packaged in the miniature device case, the transistor outline case, or the integral case.

4. The optical module according to claim 1, wherein the optical module further comprises a wavelength division multiplexer (WDM) and the optical transceiver assembly comprises a semiconductor laser diode (LD), a receiver, a silicon microring resonator, and a collimation lens;

wherein the optical module is configured such that after entering a first microring through an upper semi-ring of the first microring in the silicon microring resonator, light of a second wavelength emitted by the LD is transmitted to a first straight line that is connected to a lower semi-ring of the first microring, and is multiplexed with downstream incident light of a first wavelength, and after being reflected to the second downstream optical port by using the collimation lens, light obtained by multiplexing enters the WDM and is output, wherein the downstream incident light of the first wavelength is input to the first straight line of the optical module through the first downstream optical port; and wherein the optical module is configured such that upstream incident light is reflected by the WDM to the second upstream optical port and enters the optical module, the collimation lens in the optical module reflects the upstream incident light to a second straight line in the silicon microring resonator, and a second microring and a third microring in the silicon microring resonator that are connected to the second straight line correspondingly pass light, of a third wavelength corresponding to the wavelength of the optical module, formed by a transverse electric (TE) wave and a transverse magnetic (TM) wave, and send the light of the third wavelength to the receiver, wherein light of another wavelength except the light of the third wavelength in the upstream light is reflected by the second straight line in the microring to the first upstream optical port for output.

5. The optical module according to claim 1, wherein the optical transceiver assembly comprises a first wavelength division multiplexer (WDM 1), a second wavelength division multiplexer (WDM 2), a semiconductor laser diode (LD), a first filter (TFF 1), a second filter (TFF 2), a receiver, and a mirror;

wherein the optical module is configured such that when entering the optical module through the first optical port and being reflected by the mirror to the TFF 1, downstream incident light of a first wavelength is reflected, and is multiplexed with light of a second wavelength generated by the LD, and after entering the WDM 1, downstream light formed by multiplexing is projected to the second optical port for output; and wherein the optical module is configured such that after upstream incident light enters the optical module through the second optical port, the upstream incident light is reflected to the TFF 2 by using the WDM 1, and the TFF 2 passes light of a third wavelength corresponding to the wavelength of the optical module and sends the light of the third wavelength to the receiver, wherein after being reflected by the TFF 2, light of another wavelength except the light of the third wavelength in the upstream incident light is reflected by the WDM 2 and the mirror to the first optical port for output.

6. A bandwidth adjustable optical module, wherein the bandwidth adjustable optical module comprises at least two optical modules, each of the at least two optical modules comprising:

a first electrical interface and a second electrical interface;

a first optical port and a second optical port; and an optical transceiver assembly;

wherein the first electrical interface is configured to be connected to an electrical interface of a first board or an electrical interface of another optical module, and the second electrical interface is configured to be connected to an electrical interface of a second board or an electrical interface of another optical module;

wherein the first optical port is configured to be connected to an optical transmission device or an optical port of another optical module, and the second optical port is configured to be connected to an optical receiving device or an optical port of another optical module;

wherein the optical module is connected, via the first electrical interface and the first optical port and/or via the second electrical interface and the second optical port to at least one other optical module, so as to form an arrangement of multiple cascaded optical modules;

wherein the optical transceiver assembly is configured to generate light and to multiplex the generated light with light input via the first optical port;

wherein the second optical port is configured to output the multiplexed light;

wherein the optical transceiver assembly is configured to filter light corresponding to a wavelength of the optical module out from light input through the second optical port;

wherein the first optical port is configured to output the filtered light;

wherein the first optical port comprises a first upstream optical port and a first downstream optical port, and the second optical port comprises a second upstream optical port and a second downstream optical port;

wherein the second downstream optical port of the second optical interface is configured to output the multiplexed light; and wherein the first upstream optical port of the second optical interface is configured to output the filtered light;

wherein the at least two optical modules are cascaded by using the one or more respective first electrical interfaces, one or more respective second electrical interfaces, one or more respective first optical ports, and one or more respective second optical ports and wherein an adjustable bandwidth of the bandwidth adjustable optical module formed by cascading is a sum of bandwidths of the at least two cascaded optical modules, wherein a respective first electrical interface of a first optical module of the at least two cascaded optical modules is connected to a respective second electrical interface of a second optical module of the at least two cascaded optical modules, and a respective first optical port of the first optical module is connected to a respective second optical port of the second optical module; and wherein an optical port of the at least two cascaded optical modules that is not connected to another optical module of the at least two cascaded optical modules is connected to an optical transceiver device, and an electrical interface of the at least two cascaded optical modules that is not connected to another optical module of the at least two cascaded optical modules is connected to a board.

* * * * *

UNITED STATES PATENT AND TRADEMARK OFFICE
CERTIFICATE OF CORRECTION

PATENT NO. : 10,128,970 B2
APPLICATION NO. : 15/187437
DATED : November 13, 2018
INVENTOR(S) : Yue Wen et al.

Page 1 of 1

It is certified that error appears in the above-identified patent and that said Letters Patent is hereby corrected as shown below:

In the Claims

Column 17, Line 1-6, "wherein the second downstream optical port of the second optical interface is configured to output the multiplexed light; and wherein the first upstream optical port of the second optical interface is configured to output the filtered light" should read -- wherein the second downstream optical port of the second optical port is configured to output the multiplexed light; and wherein the first upstream optical port of the first optical portal is configured to output the filtered light --

Column 17, Line 7-8, "wherein the transceiver optical assembly comprises a receiver optical subassembly and a transmitter optical subassembly" should read -- wherein the optical transceiver assembly comprises a receiver optical subassembly and a transmitter optical subassembly --

Column 17, Line 32-34, "wherein the transmitter optical subassembly further comprises miniature device case" should read -- wherein the transmitter optical subassembly further comprises a miniature device case --

Column 19, Line 5-10, "wherein the second downstream optical port of the second optical interface is configured to output the multiplexed light; and wherein the first upstream optical port of the second optical interface is configured to output the filtered light" should read -- wherein the second downstream optical port of the second optical port is configured to output the multiplexed light; and wherein the first upstream optical port of the first optical port is configured to output the filtered light --

Column 19, Line 11-12, "wherein the at least two optical modules are cascaded by using the one or more respective first electrical interfaces" should read -- wherein the at least two optical modules are cascaded by using one or more respective first electrical interfaces --

Signed and Sealed this
Seventh Day of May, 2019

Andrei Iancu
*Director of the United States Patent and Trademark Office*